(12) United States Patent
Mann et al.

(10) Patent No.: US 6,529,862 B1
(45) Date of Patent: Mar. 4, 2003

(54) METHOD AND APPARATUS FOR DYNAMIC MANAGEMENT OF TRANSLATED CODE BLOCKS IN DYNAMIC OBJECT CODE TRANSLATION

(75) Inventors: George A. Mann, Phoenix, AZ (US); Bruce A. Noyes, Phoenix, AZ (US); Rene-Joseph Chevance, Palaiseau (FR)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/345,146

(22) Filed: Jun. 30, 1999

(51) Int. Cl.[7] ............................. G06F 9/44; G06F 9/45
(52) U.S. Cl. ......................... 703/26; 717/138; 717/139
(58) Field of Search ................................. 717/138, 139; 703/21, 26, 27, 13, 14, 15

(56) References Cited

U.S. PATENT DOCUMENTS

| | | | | |
|---|---|---|---|---|
| 5,742,802 A | * | 4/1998 | Harter et al. | 712/227 |
| 5,790,825 A | * | 8/1998 | Traut | 712/209 |
| 5,889,996 A | * | 3/1999 | Adams | 395/705 |
| 6,163,764 A | * | 12/2000 | Dulong et al. | 703/26 |
| 6,366,876 B1 | * | 4/2002 | Looney | 703/25 |

\* cited by examiner

Primary Examiner—Russell Frejd
Assistant Examiner—Todd Ingberg
(74) Attorney, Agent, or Firm—Bruce E. Hayden; James H. Phillips; John S. Solakian

(57) ABSTRACT

In a data processing system implementing Dynamic Object Code Translation (DOCT) for emulating Target system instructions on a Host system, each Target system instruction has an associated index/offset field and an associated code tag that identifies whether the Target instruction has been translated into Host code, and if already translated, whether it is an entry point, middle, or last instruction in a block of code. When an emulator encounters a code tag indicating an entry point into a block of code, execution control is transferred to the corresponding Host code. Upon completion of the Host code block, execution control is returned to the emulator, with an indication of the next Target system instruction to execute. One code tag value is utilized to identify self-modified code. Another code tag value is utilized to indicate how often untranslated Target instructions have been interpreted in order to determine when to perform DOCT.

17 Claims, 5 Drawing Sheets

METHOD AND APPARATUS FOR DYNAMIC MANAGEMENT OF TRANSLATED CODE BLOCKS IN DYNAMIC OBJECT CODE TRANSLATION

CROSS REFERENCE TO RELATED APPLICATION

This application is related to our copending patent application entitled "METHOD AND APPARATUS FOR EMULATING SELF-MODIFYING CODE", application Ser. No. 09/345,331, filed of even date herewith, and assigned to the assignee hereof.

This application is related to our copending patent application entitled "STORAGE STRUCTURE FOR DYNAMIC MANAGEMENT OF TRANSLATED CODE BLOCKS IN DYNAMIC OBJECT CODE TRANSLATION", application Ser. No. 09/340,497, filed of even date herewith, and assigned to the assignee hereof.

FIELD OF THE INVENTION

The present invention generally relates to computer system emulation, and more specifically to dynamic management of translated code in dynamic object code translation.

BACKGROUND OF THE INVENTION

The cost of designing a computer processor continues to increase. Some computer architectures thus ultimately become uneconomical to implement directly, despite these architectures having significant installed bases.

One solution to this problem is to simulate (or emulate) one computer architecture on another computer architecture. Herein, the simulating (or emulating) computer architecture will be termed the "Host" computer system, while the simulated (or emulated) computer architecture will be termed the "Target" computer system. Emulators have been available almost since the advent of the first compilers.

The traditional technique employed for Target system emulation or simulation is to interpret the Target system code. One disadvantage of interpreting Target system code is that of performance. In particular, in a typical emulation, many Target instructions will be executed a great number of times. It can be quite inefficient to repeatedly decode the same Target system instructions just to execute the same Host system instructions in response to that Target instruction decode.

One of the techniques developed to deal with that disadvantage is termed "Dynamic Object Code Translation" (or "DOCT"). When DOCT is utilized, the Target system code is dynamically translated to Host instructions. The Host instructions are then stored for future execution whenever the corresponding Target instruction or instructions are to be executed.

There is an adage or rule in computer science that 10% of the code does 90% of the work. One result of this rule when applied to Target system emulation is that most of the Target system instructions actually emulated constitute a small percentage of the actual Target system code. DOCT utilizes resources that could otherwise be dedicated to interpreting Target system instructions. Thus, in many cases it is more efficient overall to only perform DOCT on selected high-usage portions of Target system code, and to interpret the remaining Target system code.

Recent prior art is replete with different methodologies for optimizing the point at which DOCT is performed. One published solution is termed "Hot Spot" determination.

Special problems arise in systems implementing DOCT to emulate Target system code when the word size of the Host computer differs from the word size of the Target computer system. Another problem that arises when implementing DOCT for some Target systems is that Target system code and data are difficult, if not impossible, to differentiate when dealing with Target system object code. Another problem is the necessity in some Target system architectures to support self-modifying code. Another problem is the necessity in some Target system architectures to support dynamic code overlays.

It would thus be advantageous to be able to have an architecture and methodology for supporting different word size DOCT emulation, dynamic identification of instructions, self-modifying code, and dynamic code overlays.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

Figure 1:
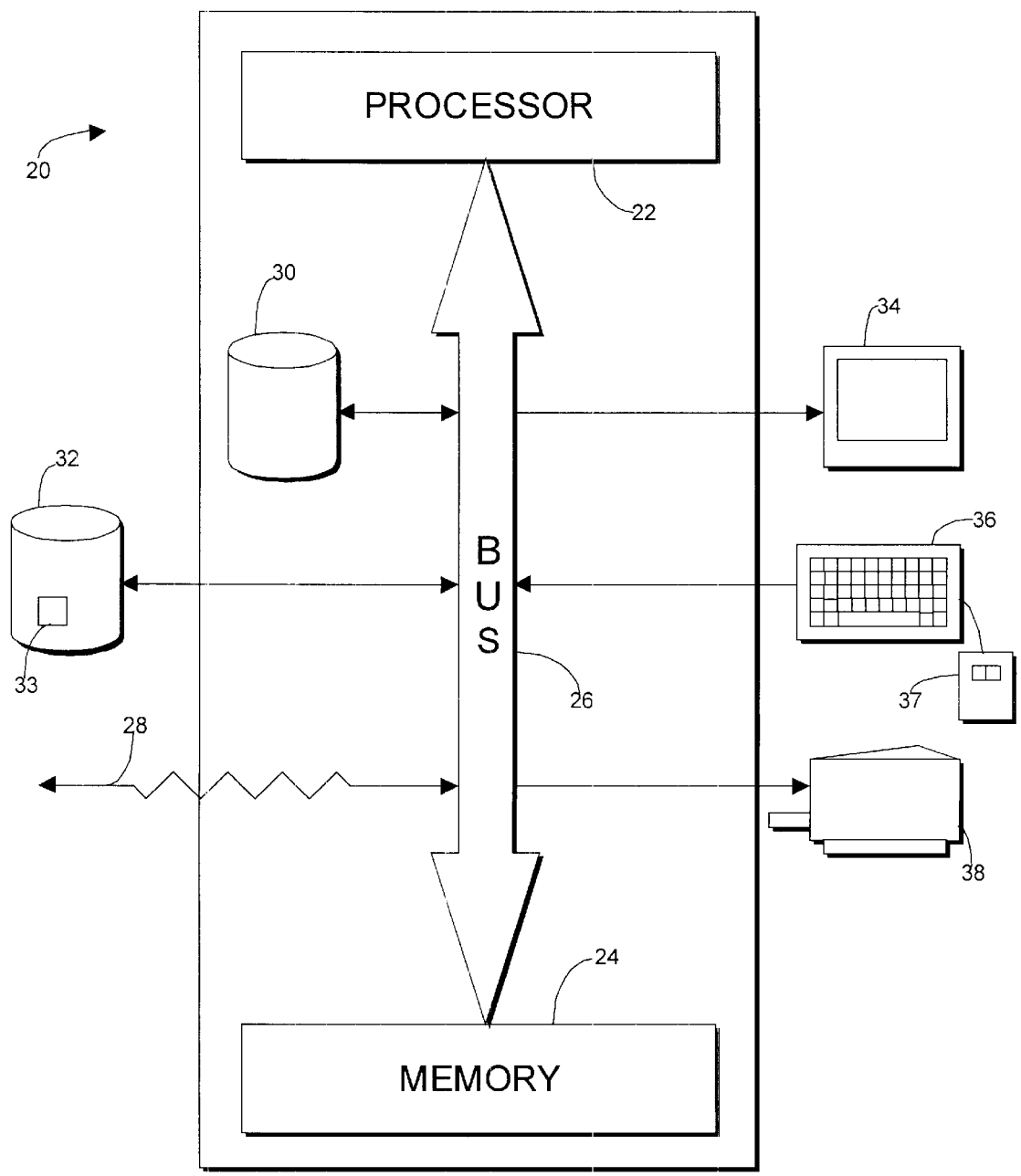
FIG. 1 is a block diagram illustrating a General Purpose Computer 20, in accordance with a preferred embodiment of the present invention.

In a data processing system implementing Dynamic Object Code Translation (DOCT) for emulating Target system instructions on a Host system, each Target system instruction has an associated index/offset field and an associated code tag that identifies whether the Target instruction has been translated into Host code, and if already translated, whether it is an entry point, middle, or last instruction in a block of code. When an emulator encounters a code tag indicating an entry point into a block of code, execution control is transferred to the corresponding Host code. Upon completion of the Host code block, execution control is returned to the emulator, with an indication of the next Target system instruction to execute. One code tag value is utilized to identify self-modified code. Another code tag value is utilized to indicate how often untranslated Target instructions have been interpreted in order to determine when to perform DOCT.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Emulating a first computer architecture on a second computer architecture is a well-known technique in the area of data processing. It is becoming more common as the cost of developing new generation computer architectures continues to escalate. A program, called an "emulator", on a data processing system with the second computer architecture executes code designed for the first computer architecture: in essence pretending that it has the first computer architecture. The computer system having the second computer architecture and that executes the emulator program is termed the "Host" computer system. A virtual computer system having the first ("emulated") computer architecture is termed the "Target" system. Often both Target user and operating system software is executed together by the emulator on the Host system, with the Target operating system managing resources for the Target user programs.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard 36 with a mouse 37, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such as test programs, operating systems, and user programs can be stored in a Computer Software Storage Medium, such as memory 24, Secondary Storage 30, and External Storage 32. Executable versions of computer software 33 can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

The GCOS® 8 data processing system has a complex 36-bit word architecture. In the preferred embodiment, a Target GCOS 8 computer system is emulated on a Host computer system having a different word size. In that preferred embodiment, the Host computer system has a 64-bit word size. One such Host computer architecture having a 64-bit word size is the Intel IA-64 architecture. However, other Host and Target architectures are within the scope of this invention.

Figure 2:
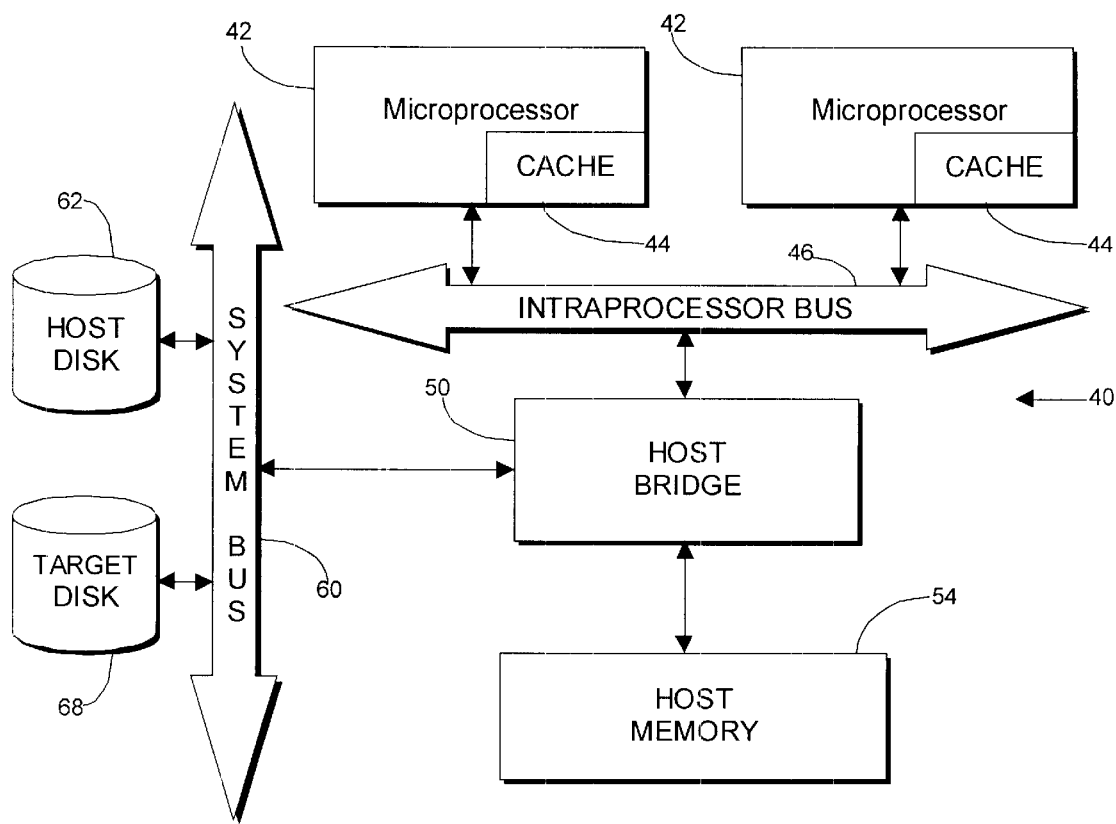
FIG. 2 is a block diagram illustrating a multiprocessor Host system utilized to emulate a Target system with a narrower word size, in accordance with the present invention.

FIG. 2 is a block diagram illustrating a multiprocessor Host system utilized to emulate a Target system with a narrower word size. In the preferred embodiment, the Host system utilizes 64-bit words, whereas the Target system supports 36-bit words. A multiprocessor system is shown in order to provide the level of performance necessary to emulate large-scale enterprise level Target systems. The multiprocessor system 40 shows two (2) microprocessors 42, each containing its own local cache memory 44. Some examples of microprocessors include Pentium II and Merced microprocessors from Intel Corporation, PowerPC microprocessors from Motorola, Inc. and IBM, and SPARC processors from Sun Microsystems. The cache memory 44 is typically implemented as extremely high-speed static random access memory (SRAM). The cache memory 44 may be implemented on the same semiconductor die as the microprocessor 42, or may be implemented as part of a multi-chip-module (MCM) with the microprocessor 42, or both. In any case, the cache memory 44 for each microprocessor 42 is dedicated to that microprocessor 42. Note here that a single level of cache memory 44 is illustrative. Other cache memory configurations are within the scope of this invention. Note also that two microprocessors are shown. This is for illustrative purposes, and it is understood that this invention envisions emulating a multiprocessor Target system on either a single processor or a multiprocessor Host system.

The two shown microprocessors 42 are coupled by and communicate over an intraprocessor bus 46. One of the functions of this intraprocessor bus 46 is to allow the two microprocessors 42 to communicate sufficiently so as to maintain coherence between their respective cache memories 44. A single bus has been shown. However, multiple busses are also within the scope of this invention.

Also coupled to the intraprocessor bus 46 is a Host bridge 50. This provides communications between the microprocessors 42 and the remainder of the computer system 40. Coupled to the Host Bridge 50 is Host memory 54. This is typically Dynamic Random Access Memory (DRAM). However, other types of memory may be utilized, including SRAM. Host memories 54 typically contain several orders of magnitude more memory than the cache memories 44.

Also coupled to the Host Bridge 50 is a system bus 60. The system bus 60 is utilized to couple the system 40 to lower speed peripheral devices. These lower speed peripheral devices can include display monitors, keyboards, communications devices, and the like (not shown here). Also coupled to the system bus are disk drives and other forms of storage capable of permanently storing data for the computer system 40. Shown in this figure are a Host disk drive 62 and a Target disk drive 68. The Host disk drive 62 typically contains the software required to emulate the Target system on the Host system. The Target disk drive 68 contains the software being emulated and the data on which it operates. It should be noted that the Host disk drive 62 is shown distinct from the Target disk drive 68. Additionally, only a single Host disk drive 62 and Target disk drive 68 are shown. It is shown this way for illustrative purposes. However, the present invention also envisions combining the two on shared drives. It must also be noted that the Target disk drive 68 will often actually consist of a large number of different physical disk drives. This is especially true when Host systems capable of supporting enterprise level databases are emulated.

Memory is considered herein a relatively high speed machine readable medium and includes Volatile Memories, such as DRAM 54, and SRAM 44, and Non-Volatile Memories (not shown) such as, ROM, FLASH, EPROM, and EEPROM. Secondary Storage 62, 68 includes machine-readable media such as hard disk drives, and magnetic drum. External Storage (not shown) includes machine-readable media such as floppy disks, removable hard drives, magnetic tape, CD-ROM, and even other computers, possibly connected via a communications line. The distinction drawn here between Secondary Storage 62, 68 and External Storage is primarily for convenience in describing the invention. As such, it should be appreciated that there is substantial functional overlap between these elements. Computer software such as Target emulation software and user programs can be stored in a Computer Software Storage Medium, such as Memory 44, 54, Secondary Storage 62, 68, and External Storage. Executable versions of computer software can be read from a Non-Volatile Storage Medium such as External Storage (not shown), Secondary Storage 62, 68, and Non-Volatile Memory (not shown), and loaded for execution directly into Volatile Memory 44, 54, executed directly out of Non-Volatile Memory, or stored on the Secondary Storage 62, 68 prior to loading into Volatile Memory 44, 54 for execution.

Figure 3:
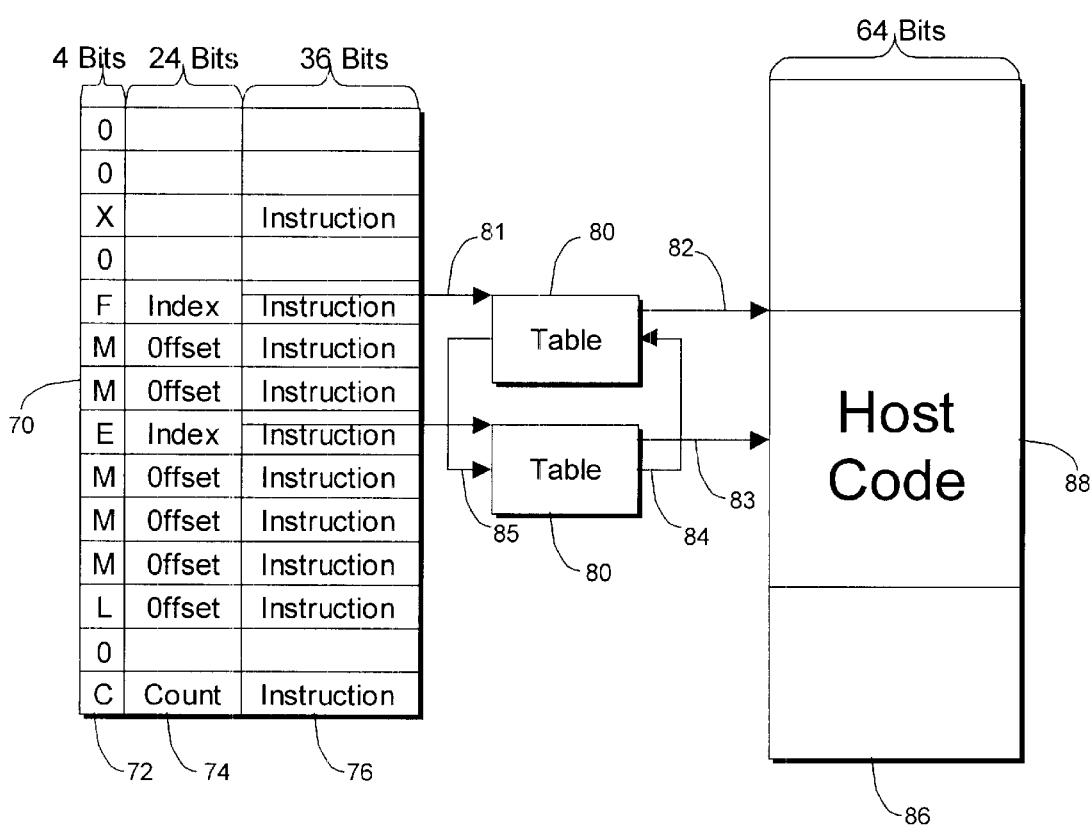
FIG. 3 is a block diagram illustrating data structures utilized in a preferred embodiment to implement Dynamic Object Code Translation, in accordance with a preferred embodiment of the present invention.

FIG. 3 is a block diagram illustrating data structures utilized in a preferred embodiment to implement Dynamic Object Code Translation. Target system code 76 is stored in a Target system code array 70 in Host memory 54. In this FIG., the Target system code 76 is shown as 36 bits of code stored right justified in 64-bit Host memory 54 words. In each word of the Target system code array 70, the remainder of the bits are split between a 4-bit Target code tag 72 and a 24-bit Target code index/offset/count field 74. Note that other embodiments and implementations are within the scope of this invention. Here, the Target code tag 72 and Target code index/offset field 74 are shown in the same words as Target instructions. In an alternative embodiment, these are stored in parallel arrays.

Table T-1 contains describes the Target code tags 72.

TABLE T-1

Target Code Tags 72

| Code | Value | Explanation |
|---|---|---|
| 0 | 0 | Zero (untranslated) |
| X | 1 | Don't translate (self-modified code) |
| M | 2 | Member of code sequence |
| L | 3 | Last entry in code sequence |
| F | 4 | First entry of code sequence |
| E | 5 | Entry into code sequence |
| C | 8 | Counting instruction executions |

When Target code 76 is initially loaded into memory 54, the Target code tag 72 will be zero (0) or initialized. This indicates that the Target code 76 has not been translated. As long as the Target code tag 72 remains zero, the Target code 76 will be interpreted. However, at some point it may be advantageous to dynamically translate the Target code 76 into Host code 88, since the translated Host code 88 will invariably execute more quickly than the Target code 76 can be interpreted. This is particularly important for code that is heavily utilized.

When a Target instruction 76 is first interpreted, it is marked as being counted by setting the corresponding code tag 72 to a "C" and the index/offset/count field 74 to zero. Then whenever the Target instruction 76 is interpreted, the count field is incremented and compared to a maximum. When the count exceeds the maximum, Dynamic Object Code Translation (DOCT) is performed on the block of Target code containing the Target instruction 76 being interpreted. In this embodiment, the "C" code tag 72 is shown as a single value. However, it is implemented in an alternate embodiment as a bit modifying the remainder of the code tags 72. This provides a mechanism for dynamically identifying Target instruction 76 blocks and entry points.

When Target code 76 is translated into Host code 88, it is typically best done a block at a time. Such a block is typically entered through some sort of jump or subroutine invocation instruction. However, this invention is not dependent upon the type of instruction that begins a block of code. In this embodiment, the first Target code instruction 76 of the block translated is marked with an "F" or "First" tag. An index in the index/offset field addresses or indexes 81 a block entry table 80. The block entry table 80 in turn addresses the start of the Host code 88 block in memory 54. Thus, when the emulator detects the "F" code, it utilizes the corresponding index/offset field 74 to index/address 81 the block entry table 80, and an entry in the block entry table 80 to address the Host code 88. Control is then transferred to the Host code 88 at that point. The Host code 88 is then executed until the end of a block is encountered, at which time control is transferred back to the emulator with an indication of where to pick up interpreting code.

Within a block of Target code 76 corresponding to a block of Host code 88, instructions are marked with a "M" or "Member" Target code tag 72. This marking is typically done as a part of the translation. The index/offset field 74 corresponding to the instruction will contain the offset of the first instruction in the Host code 88 corresponding to the Target code instruction 76. This provides an efficient mechanism for implementing alternate entry points into the block of code (see "E" code tag 72 discussion below). In an alternative embodiment, the index/offset field will contain a two-part field, with one part being the offset of the corresponding "F" or "First" instruction, and the second part containing a corresponding offset into the Host code 88 for that Target instruction 76. This provides an efficient mechanism to both identify the corresponding "First" or "F" instruction in the block containing this Target instruction 76, and to identify where the Host code 88 translation of that Target instruction 76 begins.

When alternate entry points into a block of code are detected, they are marked with an "E" or "Entry" Target code tag 72. As with the "F" or "First" Target code tag 72, the index/offset field 74 for the Target instruction 76 indexes/addresses 81 a block entry table 80, which in turn points to or addresses 83 the start of the corresponding Host code 88. The block entry tables 80 corresponding to a block of Host code 88 (or Target instructions 76) are chained together. In this FIG., a forward chain 85 is shown linking all of the block entry tables 80 in the block of code together. A link 84 is also shown linking the block entry tables 80 for secondary or alternate "Entry" points to the block entry table 80 for the main for "First" entry point into the block of code. Other methods of chaining or linking block entry tables 80 are also within the scope of this invention.

In the preferred embodiment, the block entry tables 80 also include links to block entry tables 80 for other Host code blocks 88, fields for entry count incremented every time the Host block code 88 is executed, and a time stamp for the last time the Host code block 88 was executed. This information can be used to manage, deallocate, reuse, or garbage-collect Host code blocks 88, should the need arise. The time stamp can be used to implement a Least Recently Used (LRU) replacement algorithm, while the entry count can be utilized to implement a Least Used replacement algorithm.

In an alternate embodiment, the block entry tables 80 include an entry count field that is incremented every time the code block is entered. In this alternative embodiment, "F" and "E" block entry tables 80 are allocated the first time it is determined that the Target instruction 76 is an entry point into the code block. When the entry count field exceeds a maximum value, Dynamic Object Code Translation is performed on the Target block of code to generate the Host code 88 block, which is then linked into the corresponding block entry tables 80. This embodiment typically utilizes the entry count field in the block entry tables 80 instead of the index/offset/count field 74 in combination with "C" code tags 72, as discussed above. Note that the entry count field can also be utilized as discussed above to implement a Least Used replacement algorithm.

The last instruction in a Target code block is marked with a "L" or "Last" Target code tag 72. The Target instructions 76 marked with an "L" are treated similarly to Target instructions marked with an "M". The "L" or "Last" code tag 72 typically corresponds to an indirect jump or return Target instruction 76. At the end of every sequence of Host code 88 instructions that return control to the emulator, there will be an indicator or parameter identifying the next Target instruction 76 for the emulator to execute.

Special handing is typically necessary for self-modifying code. Self-modifying code is code that is modified by the program containing the modified code. In other words, a program modifies its own code. One reason for this special handing is that the mapping from Target code to Host code is typically one-to-many, and that the replacement Target instruction will often translate into a different number of instructions than did the Target instruction being replaced. Self-modifying code is detected by checking for non-zero Target code tag fields 72 whenever a store is made to memory 54 potentially containing modifiable Target code. In the preferred embodiment, the modified Target instruction 76 is marked by an "X" or "Don't Translate" Target code tag 72. This inhibits further translation of that instruction. Instead, any Target instruction 76 marked with an "X" Target code tag 72 is always interpreted.

Other special handling is also typically required, especially if the modified instruction is in the middle of a Target block of code. Under normal circumstances, when program execution is not currently in the Host code block 88 corresponding to the Target code block containing the modified instruction, it is sufficient to mark the entire code block with "X" and deallocate the corresponding Host code block 88. Alternatively, the Host code block 88 can be split into two Host code blocks 88: one before the modified code, and one after.

More care is required when the modified Target instruction is in the Target code block currently being executed. In this case, especially in the embodiment where the entire Target code block is marked with "X", the remainder of the Target code block after the modified instruction is preferably interpreted, instead of executing the remainder of the corresponding Host code 88 block. This requirement can be overcome when the Host code block 88 is split. In that embodiment, the Target instruction before the modified instruction is now marked with a "L" or "Last" Target code tag 72 to indicate the end of a Target code block, and the corresponding translated code in the first Host code block 88 is terminated by an instruction or instructions transferring control back to the interpreter (see discussion of "L" type instruction handling above). These transfer instructions can typically overlay the first Host instruction or instructions corresponding to the modified Target instruction before it was modified. The first instruction after the modified Target instruction will then be marked with an "F" Target code tag 72 indicating that it is the first Target instruction in a Target code block. The corresponding block entry table 80 will be created and linked 81 into the index/offset field 74 corresponding to the Target instruction 76. The case of modification of successive Target instructions can be easily detected since the previous Target instruction will already be marked with an "X" Target code tag 72.

Self-modifying code has been discouraged for a number of years as a coding practice. Nevertheless, it still exists, especially in legacy operating system code. One method for minimizing the impact that the special handling required for supporting emulation of self-modifying code in an operating system is to delay dynamic object code translation (DOCT) until after initialization of the operating system is complete. This is effective in many cases because most code that is self-modified by the operating system is modified during the process of system initialization.

Figure 4:
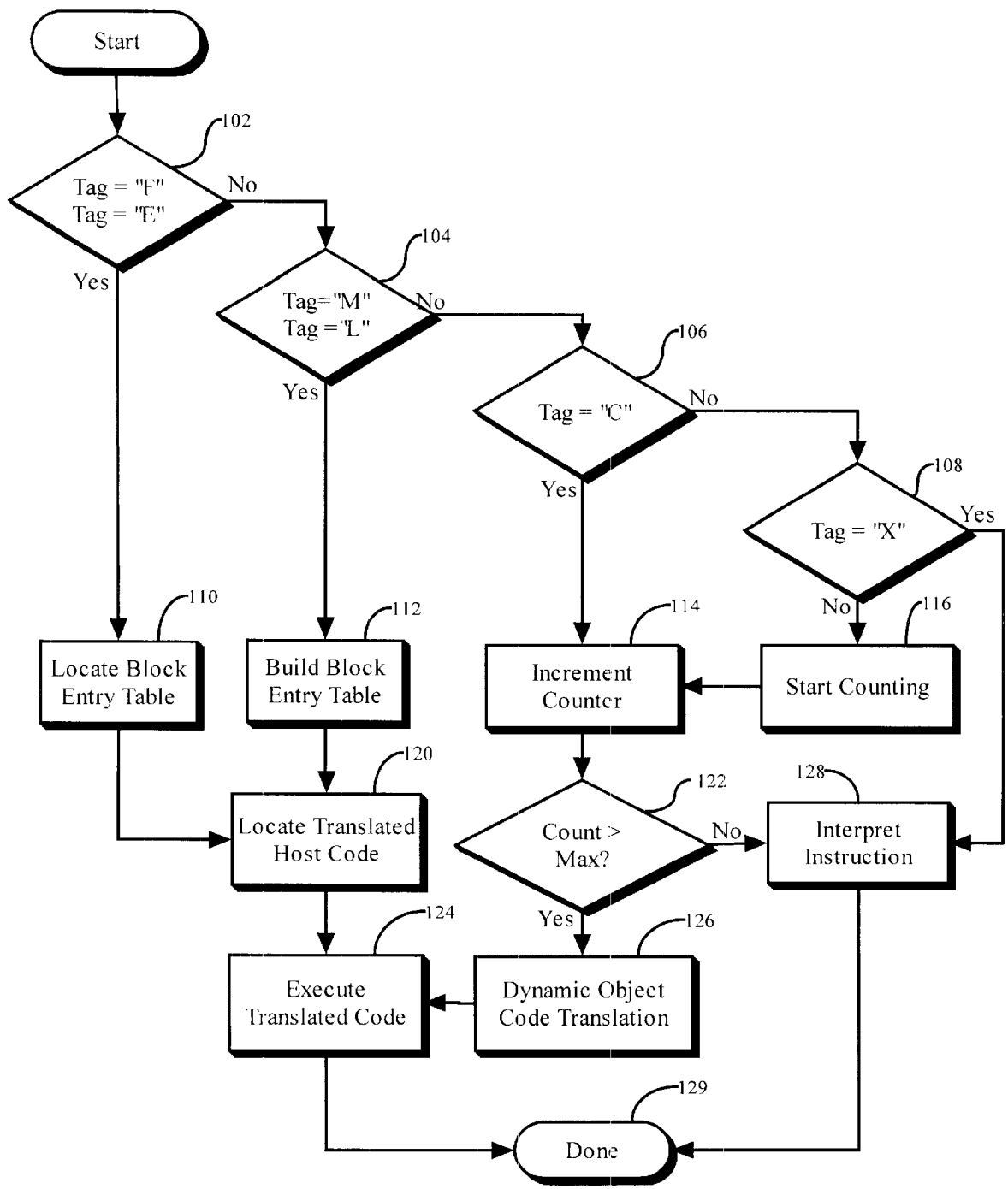
FIG. 4 is a block diagram of the main portion of an emulator loop, in accordance with a preferred embodiment of the present invention.

FIG. 4 is a block diagram of the main portion of an emulator loop, in accordance with a preferred embodiment of the present invention. This is executed for each Target instruction 76 to be emulated. It starts by testing whether the Target code tag 72 is an "F" or an "E", step 102. In the preferred embodiment this is done efficiently by testing the second-high-order bit in the Target code tag 72 (or optionally, the second-high-order bit in the Target word). If either a code tag of either an "F", or an "E", step 102, or an "E", step 104, was found, the corresponding Block Entry Table, 80 is located, step 110, by using the index/offset field 74 corresponding to the instruction. The start of the corresponding Host code 88 is located 82, 83, step 120, and execution control is transferred to that Host code 88 block, step 124. Execution control returns to the emulator at the end of the execution of the Host code 88 block, and the main portion of the loop exits, step 129.

Otherwise, if neither an "F" nor an "E" code tag 72 was found, step 102, a test is made for either an "M" or "L" code tag 72, step 104. In this case, where either an "M" or "L" code tags 72 is encountered, step 104, the or "L" code tag is converted into an "E" code tag 72 entry. A block entry table 80 is constructed for the entry point pointing 83 to the appropriate Host Code 88, the block entry table 80 is linked to the corresponding "F" block entry table 80, and the new block entry table 80 is linked 81 into the index/offset field 74 corresponding to the instruction, step 112. The start of the corresponding Host code 88 is located 82, 83, step 120, and execution control is transferred to that Host code 88 block, step 124. Execution control returns to the emulator at the end of the execution of the Host code 88 block, and the main portion of the loop exits, step 129.

Otherwise, if neither an "M" nor an "L" code tag 72 is found, step 106, a test is made for a "C" code tag 72, step 104. In this case, where a "C" code tags 72 has been encountered, step 106, the counter corresponding to the Target Instruction 76 is incremented, step 114, and is compared to a maximum counter value, step 122. If the counter exceeds the maximum counter value, step 122, Dynamic Object Code Translation (DOCT) is performed on the block of Target code to generate the Host code block 88, step 126. The corresponding block entry tables 80 are created to point at entry points in the Host code block 88 and are linked 81 into the index/offset field 74 corresponding to the "F" and "E" instructions 76. Execution control is transferred to that Host code 88 block, step 124. Execution control returns to the emulator at the end of the execution of the Host code 88 block, and the main portion of the loop exits, step 129. If the counter does not exceed the maximum counter value, step 122, the Target instruction 76 is interpreted, step 128, and the main portion of the loop exits, step 129.

Otherwise, if a "C" code tag 72 was not found, step 106, a test is made for an "X" code tag 72, step 108. If an "X" code tag 72 was encountered, step 108, the Target instruction 76 is interpreted, step 128, and the main portion of the loop exits, step 129. Otherwise, if an "X" code tag 72 was not encountered, step 108, instruction execution counting is started, step 116. The code tag 72 corresponding to the Target instruction 76 is set to a "C" type code tag 72. The count field associated with the Target instruction 76 is initialized. Then, the counter corresponding to the Target Instruction 76 is incremented, step 114, and is compared to a maximum counter value, step 122. If the counter exceeds the maximum counter value, step 122, Dynamic Object Code Translation (DOCT) is performed on the block of Target code to generate the Host code block 88, step 126 and execution control is transferred to the newly created Host code block 88, step 124. Otherwise, if the counter is less than the maximum counter value, step 122, the Target instruction 76 is interpreted, step 128. In any case, the main portion of the loop then exits, step 129.

In an alternate embodiment, the "C" code tag 72 tested in step 106 is implemented as a range of code tags 72 corresponding to the other code tags 72, with the high order bit set. Then, when interpreting Target instructions 76, step 128, a made testing the previous instruction interpreted. If the previous instruction interpreted transferred control into a Target block of code, the code tag 72 is additionally marked as either an "F" or "E" type of Target instruction. If the Target instruction 76 is an indirect jump or return type of instruction, it is further marked as an "L" type. This additional information can be used during Dynamic Object Code Translation, step 126, to provide for more efficient translation.

Figure 5:
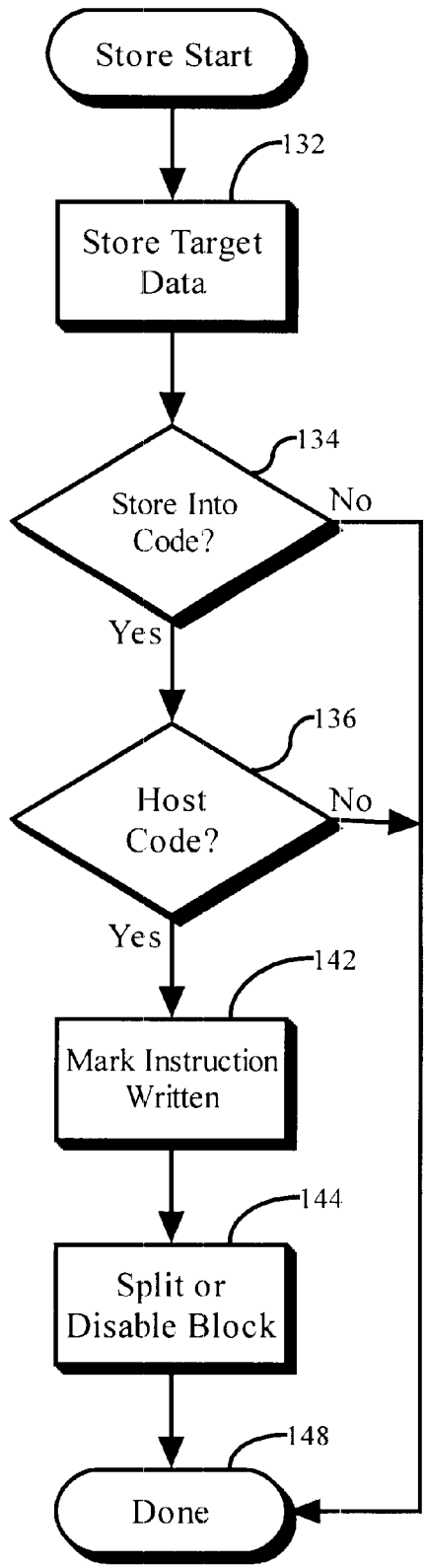
FIG. 5 is a flow chart illustrating storing the Target system data in accordance with the present invention.

FIG. 5 is a flowchart illustrating storing Target system data, in accordance with the present invention. First, the Target data is stored in Target system memory, step 132. In the preferred embodiment, the store is limited to the number of significant Target system bits. Thus, when emulating the GCOS 8 architecture, 36-bits of data are stored in the Target system memory. A test is then made whether the store was into Target code, step 134. In the preferred embodiment, this test is accomplished by testing the Target code tag 72 associated with the Target word into which the store is being made. A code tag 72 not equal to zero indicates a store into Target code. This in turn indicates self-modifying code. A test is then made whether Host code 88 has already been generated for this Target instruction 76, step 136. If Host code 88 has already been generated for this Target instruction 76, step 136, then the Target instruction is marked with a code tag 72 equal to "X" or "Don't Translate", step 142. This is to suppress subsequent Dynamic Object Code Translation (DOCT) for this Target instruction 76 since that instruction is self-modified code. Then, the block of Host code 88 is either entirely disabled, or is split, step 144. In all cases, the Store functionality then completes, step 148.

In a preferred embodiment, the block of Host code 88 containing the translated Target instruction 76 just replaced is split into two blocks of Host code 88. The last unmodified Target instruction before the modified instruction 76 is marked as a "L" or "Last" instruction. The code for that instruction 76 is followed by Host code 88 that transfers control back to the emulator. This emulator return code will return indicating that the first modified instruction is the next instruction for the emulator to execute. Then, the first instruction after the modified Target instructions 76 will be marked with a "F" code tag 72 indicating that this is the first instruction in the newly created block of code. A corresponding block entry table 80 will be created to point at the first word of Host code 88 corresponding to this Target instruction 76 and will be linked 81 into the index/offset field 74 corresponding to this Target instruction 76.

In an alternate embodiment, in step 144 each Target instruction 76 in the code block containing the self-modified code is marked with a code tag 72 equal to "X" or "Don't Translate". The corresponding Host code block 88 and block entry tables 80 are deallocated or garbage-collected. If the code is being modified by a store instruction in the current Host code block 88, control is transferred to the emulator to interpret the remainder of the code block starting at the Target instruction after the store instruction, instead of allowing execution to continue in the newly deallocated Host code block 88.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method for emulating a set of Target code instructions for a Target system by executing a plurality of Host instructions on a Host system, wherein:

each of the set of Target code instructions has a corresponding code tag value and a code locator value;

a first one of the set of Target code instructions is a first Target code instruction;

said method comprising:

A) testing the code tag value corresponding to the first Target code instruction for membership in a first set of code tag values;

B) executing a block of Host code corresponding to a block of Target code containing the first Target code instruction when the code tag value corresponding to the first Target code instruction is determined in step (A) to be in the first set of code tag values.

2. The method in claim 1 which further comprises:

C) testing the code tag value corresponding to the first Target code instruction for membership in a second set of code tag values; and D) interpreting the first Target code instruction when the code tag value corresponding to the first Target code instruction is determined in step (C) to be in the second set of code tag values.

3. The method in claim 1 which further comprises:

C) testing the code tag value corresponding to the first Target code instruction for membership in a second set of code tag values; and D) incrementing a counter corresponding to the first Target code instruction when the code tag value corresponding to the first Target code instruction is determined in step (C) to be in the second set of code tag values.
4. The method in claim 3 which further comprises:
E) testing the counter corresponding to the first Target code instruction against a minimum value when the code tag value corresponding to the first Target code instruction is in the second set of code tag values; and
F) performing dynamic object code translation on the block of Target instructions containing the first Target code instruction to create a block of Host instructions when the counter corresponding to the first Target code instruction exceeds the minimum value.
5. The method in claim 4 which further comprises:
G) linking the first Host code block from the code locator value corresponding to a first entry point into the first Target code block after the first Host code block is created in step (F).
6. The method in claim 5 wherein step (G) comprises:
inserting a link to an entry table into the code locator value corresponding to the entry point into the first Target code block; and
inserting a link to a first instruction in the first Host code block into the first entry table.
7. The method in claim 5 which further comprises:
H) linking the first Host code block from the code locator value corresponding to a second entry point into the first Target code block after the first Host code block is created in step (F).
8. The method in claim 7 wherein:
step (G) comprises:
inserting a link to a first entry table into the code locator value corresponding to the first entry point into the first Target code block; and
inserting a link to a first instruction in the first Host code block into the first entry table; and
step (H) comprises:
inserting a link to a second entry table into the code locator value corresponding to the second entry point into the first Target code block; and
inserting a link to a second instruction in the first Host code block into the second entry table.
9. The method in claim 1 which further comprises:
C) testing the code tag value corresponding to the first Target code instruction for membership in a second set of code tag values; and
D) locating a second Target code instruction utilizing the code locator value corresponding to the first Target code instruction when the code tag value corresponding to the first Target code instruction is determined in step (E) to be in the second set of code tag values, wherein the second Target code instruction is a first entry point into the first Target code block.
10. The method in claim 9 which further comprises:
E) locating a first Host code block utilizing the code locator value corresponding to the second Target code instruction.
11. The method in claim 10 wherein:
step (E) comprises:
locating a link to a first entry table utilizing the code locator value corresponding to the second Target code instruction; and
locating the first Host code block utilizing a pointer the first entry table.

12. The method in claim 11 wherein:
step (F) comprises:
inserting a link to a first entry table into the code locator value corresponding to the Target code instruction; and
inserting a link to a first instruction in the first Host code block into the first entry table.
13. The method in claim 11 which further comprises:
F) changing the code tag value corresponding to the first Target code instruction to a value in the first set of code tag values.
14. The method in claim 10 which further comprises:
F) linking the first Host code block from the code locator value corresponding to the first Target code instruction.
15. The method in claim 1 which further comprises:
C) testing the code tag value corresponding to the first Target code instruction for membership in a second set of code tag values; and
D) interpreting the first Target code instruction when the code tag value corresponding to the first Target code instruction is determined in step (C) to be in the second set of code tag values;
E) testing the code tag value corresponding to the first Target code instruction for membership in a third set of code tag values; and
F) incrementing a counter corresponding to the first Target code instruction when the code tag value corresponding to the first Target code instruction is determined in step (E) to be in the third set of code tag values;
G) testing the code tag value corresponding to the first Target code instruction for membership in a fourth set of code tag values; and
H) locating a second Target code instruction utilizing the code locator value corresponding to the first Target code instruction when the code tag value corresponding to the first Target code instruction is determined in step (G) to be in the fourth set of code tag values, wherein: the second Target code instruction is a first entry point into the first Target code block.
16. A data processing system capable of emulating a set of Target code instructions for a Target system by executing a plurality of Host instructions on a Host system, wherein:
each of the set of Target code instructions has a corresponding code tag value and a code locator value;
a first one of the set of Target code instructions is a first Target code instruction;
said data processing system comprising:
A) a set of computer instructions stored in a memory for testing the code tag value corresponding to the first Target code instruction for membership in a first set of code tag values;
B) a set of computer instructions stored in a memory for executing a block of Host code corresponding to a block of Target code containing the first Target code instruction when the code tag value corresponding to the first Target code instruction is determined in element (A) to be in the first set of code tag values.
17. A machine readable medium containing emulator software for emulating a set of Target code instructions for a Target system by executing a plurality of Host instructions on a Host system, wherein:

each of the set of Target code instructions has a corresponding code tag value and a code locator value;

a first one of the set of Target code instructions is a first Target code instruction;

said emulator comprising:

A) a set of computer instructions for testing the code tag value corresponding to the first Target code instruction for membership in a first set of code tag values;

B) a set of computer instructions for executing a block of Host code corresponding to a block of Target code containing the first Target code instruction when the code tag value corresponding to the first Target code instruction is determined in element (A) to be in the first set of code tag values.

* * * * *